United States Patent
Kejriwal et al.

(10) Patent No.: US 9,846,781 B2
(45) Date of Patent: Dec. 19, 2017

(54) UNUSED PARAMETERS OF APPLICATION UNDER TEST

(71) Applicant: HEWLETT-PACKARD DEVELOPMENT COMPANY, L.P., Houtson, TX (US)

(72) Inventors: Nidhi GovindRam Kejriwal, Sunnyvale, CA (US); Ronald Joseph Sechman, Alpharetta, GA (US); Sasi Siddharth Muthurajan, Cambridge, MA (US)

(73) Assignee: EntIT Software LLC, Sunnyvale, CA (US)

( * ) Notice: Subject to any disclaimer, the term of this patent is extended or adjusted under 35 U.S.C. 154(b) by 0 days.

(21) Appl. No.: 14/783,096

(22) PCT Filed: Apr. 19, 2013

(86) PCT No.: PCT/US2013/037354
§ 371 (c)(1),
(2) Date: Oct. 8, 2015

(87) PCT Pub. No.: WO2014/171950
PCT Pub. Date: Oct. 23, 2014

(65) Prior Publication Data
US 2016/0034690 A1 Feb. 4, 2016

(51) Int. Cl.
*G06F 21/57* (2013.01)
*H04L 29/06* (2006.01)
*G06F 11/36* (2006.01)

(52) U.S. Cl.
CPC ............ *G06F 21/577* (2013.01); *H04L 63/14* (2013.01); *G06F 11/3668* (2013.01); *G06F 11/3676* (2013.01); *G06F 2221/033* (2013.01)

(58) Field of Classification Search
CPC ............ G06F 2221/033; G06F 21/577; G06F 11/3676; G06F 11/3668
See application file for complete search history.

(56) References Cited

U.S. PATENT DOCUMENTS

| | | | |
|---|---|---|---|
| 7,207,065 B2 | 4/2007 | Chess et al. |
| 7,237,265 B2 | 6/2007 | Reshef et al. |
| 7,444,680 B2 | 10/2008 | Hurst et al. |
| 7,721,154 B1 | 5/2010 | Jaammour et al. |
| 7,913,303 B1 | 3/2011 | Rouland et al. |
| 7,975,296 B2 | 7/2011 | Apfelbaum |

(Continued)

FOREIGN PATENT DOCUMENTS

| | | |
|---|---|---|
| JP | 2004318759 | 11/2004 |
| WO | WO-2012166120 A1 | 12/2012 |

OTHER PUBLICATIONS

Di Lucca et al., "Testing Web-based applications: The state of the art and future trends", 2006, pp. 1172-1186.*

(Continued)

*Primary Examiner* — Thaddeus Plecha (57) ABSTRACT

Example embodiments disclosed herein relate to unused parameters. A request to a web page of an application under test is made. It is determined whether the web page includes one or more unused parameter fields. Another request to the web page of the application under test is made using one or more parameters corresponding to the unused parameter fields.

14 Claims, 4 Drawing Sheets

(56) References Cited

U.S. PATENT DOCUMENTS

| | | | |
|---|---|---|---|
| 2002/0010855 A1* | 1/2002 | Reshef | G06F 21/554 713/164 |
| 2004/0024868 A1 | 2/2004 | Drummond | |
| 2004/0044993 A1* | 3/2004 | Muller | G06F 11/3684 717/124 |
| 2004/0073800 A1 | 4/2004 | Shah et al. | |
| 2005/0204343 A1 | 9/2005 | Kisamore et al. | |
| 2006/0195725 A1 | 8/2006 | Shah et al. | |
| 2006/0206867 A1* | 9/2006 | Parsons | G06F 11/3664 717/124 |
| 2007/0074169 A1 | 3/2007 | Chess et al. | |
| 2008/0259993 A1 | 10/2008 | Konuri | |
| 2008/0263671 A1 | 10/2008 | Testa et al. | |
| 2009/0100518 A1 | 4/2009 | Overcash | |
| 2010/0050263 A1* | 2/2010 | Weisman | H04L 63/1433 726/25 |
| 2010/0083240 A1 | 4/2010 | Maty | |
| 2011/0173600 A1 | 7/2011 | Thompson | |
| 2011/0302566 A1 | 12/2011 | Abadi et al. | |
| 2012/0167059 A1* | 6/2012 | Kosuda | G06F 11/3676 717/131 |
| 2012/0226487 A1 | 9/2012 | Birch et al. | |
| 2012/0260344 A1* | 10/2012 | Maor | G06F 11/3688 726/25 |
| 2013/0007886 A1* | 1/2013 | Tripp | H04L 63/1433 726/25 |
| 2013/0036404 A1* | 2/2013 | Shu | G06F 11/3676 717/127 |
| 2013/0060507 A1 | 3/2013 | Kianovski et al. | |
| 2014/0129878 A1* | 5/2014 | Saltzman | H04L 67/2804 714/38.1 |

OTHER PUBLICATIONS

Fong, E., et al., Web Application Scanners: Definitions and Functions. Jan. 2007, Proceedings of the 40th Hawaii International Conference on System Sciences, IEEE Computer Society, 7 pages.
International Search Report and Written Opinion, Jan. 24, 2014, PCT Patent Application No. PCT/US2013/037354, 10 pages.
Extended European Search Report, EP Application No. 13882268.9, Date: Aug. 23, 2016, pp. 1-12, EPO.
Office action for EP Application No. 13882268.9 dated Jun. 27, 2017, 7 pp.
"Price and Feature Comparison of Web Application Scanners", online < http://www.sectoolmarket.com/price-and-feature-comparison-of-web-application-scanners-unified-list.html >, last updated Sep. 18, 2016, 8 pp.
"Fuzzing, The Open Web Application Security Project", online < https://www.owasp.org/index.php/Fuzzing >, last modified Jun. 23, 2016, 6 pp.
Weisman, O., "Glassbox Testing: Thinking Inside the Box", OWASP 2011, 28 pp.
"Acunetix Acusensor", online <http://www.acunetix.com/websitesecurity/rightwvs.htm>, downloaded from Internet Archive Wayback Machine, www.archive.org Jul. 31, 2017, 4 pp.
"Seeker Security Brite", online <http://www.seekersec.com/Technology.html>, downloaded from Internet Archive Nayback Machine, www.archive.org Jul. 31, 2017, 1 pp.
"OWASP Broken Web Application Project" online <https://code.google.com/archive/p/owaspbwa/wikis/UserGuide.wiki >, Jan. 2, 2017, downloaded from Internet Archive Wayback Machine, www.archive.org Jul. 31, 2017, 6 pp.
Application as-filed for PCT/US12/48350 filed Jul. 26, 2012, 40 pp.
International Search Report and Written Opinion for PCT/US12/48350 dated Jan. 13, 2013, 10 pp.
Daniel F et al, Active Rules for Runtime Adaptivity Management ,< http://ceur-ws.org/Vol-267/paper3.pdf >, Retrieved on Jul. 27 2012, 15 pp.
U.S. Application as-filed for U.S. Appl. No. 13/331,815 dated Dec. 20, 2011, 47 pp.
Bookstein et al.; "Generalized Hamming Distance"; 2002; 2002 Kluwer Academic Publishers; 23 pp.
Susanta Nanda et al., "Dynamic Multi-Process Information Flow Tracking for Web Application Security," 2007, pp. 1-20.
R. Sekar, "An Efficient Black-box Technique for Defeating Web Application Attacks," Feb. 2009, pp. 1-17, Stony Brook University, Stony Brook, New York, USA.
HP WebInspect for the Windows operating system, User Guide, v8.0; Mar. 2009; Retrieved from the Internet ; pp. 1-334 as printed.
ICFULL.com. A Web-based Penetration Tests Vulnerability Scanning System Design and Implementation [online], Dec. 15, 2010[retrieved on Nov. 30, 2011], Retrieved from the Internet: 3 pp.
JBroFuzz; OWASP JBroFuzz Tutorial; 2010; Retrieved from the Internet ; pp. 1-25 as printed.

* cited by examiner

UNUSED PARAMETERS OF APPLICATION UNDER TEST

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making HTTP requests and evaluating the HTTP responses or the lack thereof in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses. In a black-box approach, the scanner does not have any insight into the internal workings of the AUT.

BRIEF DESCRIPTION OF THE DRAWINGS

The following detailed description references the drawings, wherein.

DETAILED DESCRIPTION

Embodiments described herein provide techniques for performing testing of applications, such as web applications. When a company desires to know how secure a web application the company has in production is or going to be put into production, the company often uses a security testing solution such as a penetration testing solution (e.g., use of a scanner), fuzz testing, vulnerability testing, software security testing, website security testing, combinations thereof, or the like. The company may wish to use a copy of the application in production as an Application Under Test (AUT). A reason to use an application in production or an application that is going to be put into production for testing is that the company may desire to test the same code in a manner that modifications to the AUT are not allowed. Using an AUT that is going to be the application in production at a quality assurance stage ensures that the application used in production has been tested.

Dynamic testing tools discover the attack surface by emulating human-like behavior while accessing the application. Testing tools systematically start with one link and recursively extract and follow subsequent links discovered through further analysis. Additionally, the dynamic testing tools exercise the exposed application interface by clicking each button, submitting each form, and collecting various parameters for future testing in the audit cycle. Modern web applications are no longer static web pages, but highly dynamic, user-driven applications functioning both synchronously and asynchronously. Application models such as single uniform resource locator (URL) access are based on one page; however, the AUT can expose different functionality based on what input parameter name/value pairs are supplied within the request. These pages that can be exposed may represent a vulnerability of the AUT. Examples of the vulnerability may include providing information that should be secure if a parameter is filled. In one example, the AUT may have a debug parameter, an administrator parameter, or the like, that allows for access to one or more web pages, links, or other resources based on whether the parameter is filled or if the parameter is filled by a particular value (e.g., if a parameter for debug tools is true). In some examples, a parameter or combination of parameters read by a web page can be used to make a decision during execution of the web page.

In one example, in order for a particular administrator page to be displayed, a user (simulated by the scanner) may supply an arbitrary or particular value to a parameter. In certain examples, the parameter field can be named "hiddenAdmin," "backdoor," "debug," etc. A programmer may think that this is an easy way for the administrator to gain access; however, it is not a secure approach. Normal execution of the AUT would not execute this code, but users with direct insight into the source code or users stumbling upon this capability by accident may be able to access the administrator page. This administrator page may include other resources that should be protected (e.g., ability to change settings or user accounts, ability to see personal information, ability to see passwords, etc.).

Accordingly, a real-time agent on a server hosting the AUT can be deployed to monitor the normal execution of the application during a security test, such as a security scan. The real-time agent can look at code to be executed by a web page of the AUT to detect whether an unused parameter is present in a request from a scanner testing the AUT. In one example, the real-time agent monitors execution of each page and compares the parameters read from a request (e.g., a HyperText Transfer Protocol (HTTP) request) to supplied values. The real-time agent can report any parameter that is missing from the requests provided by the scanner during a crawl and/or audit of the AUT. When supplied with additional parameters, the application can reveal an undiscovered area that was previously hidden from the scanner during a discovery crawl phase, which can effectively hide the area from being audited or attacked during an attack phase.

In certain examples, parameters discovered can be via HTTP GET/POST requests or server headers, or other types of requests. For example, the requests may be language or Application Programming interface (API) specific. Further, even though the requests include test parameters known to the scanner (e.g., based on links followed), application code of the AUT that can be read by the real-time agent can be used to determine every parameter that the code expects in the request.

Thus, embodiments described herein can discover the attack surface of the AUT using an analysis of unused parameters. The approaches can be used to expose functionality that is not encountered because of the complexity of the application. Further, the approaches can be used to expose functionality that is surreptitiously inserted by a developer with what can be considered a malicious intent (e.g., a backdoor). Moreover, approaches can be used to expose parameters in server-side generated pages that reside within unlinked directories relying on security through obscurity to remain hidden.

Figure 1:
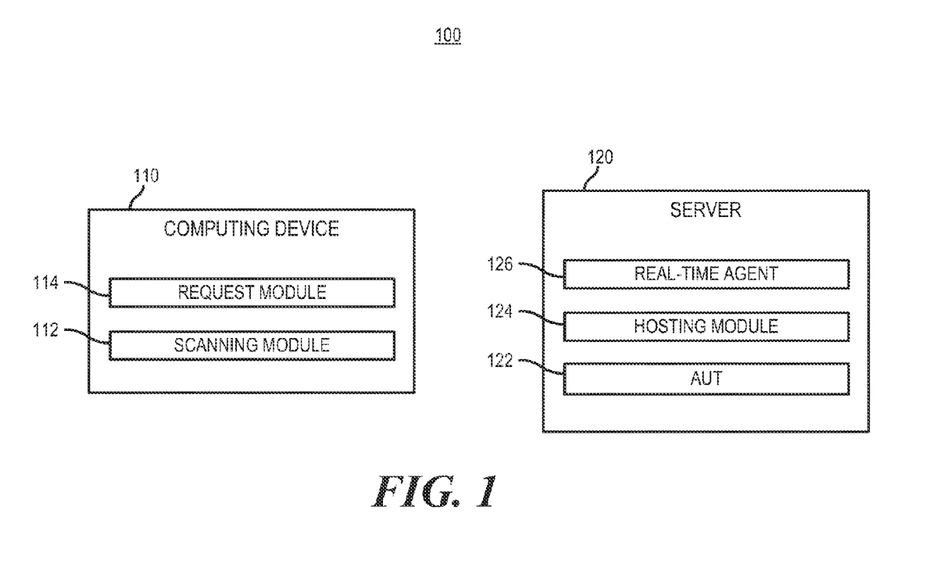
FIG. 1 is a block diagram of a system for determining unused parameters, according to one example.

FIG. 1 is a block diagram of a system for determining unused parameters, according to one example. The system 100 can include a computing device 110 and a server 120. The computing device 110 may include a scanning module 112 and a request module 114. The computing device 110 can be used to execute a security test on an application under test 122 that can be hosted using a hosting module 124. A real-time agent 126 can be present to analyze the AUT 122.

The server 120 may have a non-transitory, computer-readable media, such as storage device, for storing data, buffering communications, and storing operating programs of the server 120. Communications between the computing device 110 and the server 120 may be conducted using a request-response protocol such as the Hyper-Text Transfer Protocol (HTTP) or another application programming interface (API).

The server 120 may be an application server that hosts the AUT 122. The real-time agent 126 can monitor and the AUT 122. In certain examples, the real-time agent 126 acts as an environment for the AUT 122 to execute. In other examples, the real-time agent 126 can have access to code of the AUT 122 during execution. The real-time agent 126 can be implemented using a software framework such as the .NET framework, the Java Virtual Machine, or other similar engines. In other examples, aspect oriented programming or other software may be used. In some examples, the server 120 can be implemented as a computing device such as a laptop, a desktop computer, a workstation, or other computing device.

In one example, Java Virtual Machine instrumentation is used. An API Called Instrument can be used to monitor APIs that are called. Here, when a particular API or set of APIs is called, the instrument can monitor code, variables, etc. Similar approaches can be used in other software frameworks such as .NET. Here, the changes can be performed in memory. As such, the AUT 124 need not be modified directly. In another example, aspect oriented programming features may be used. APIs to be monitored can be specified.

The computing device 110 may include a scanning module 112 that performs a security test against the AUT 122. The security test can be a scan and may include, for example, a security crawling and auditing phase, a verification of unused parameters phase, and an attack phase. In one example, a vulnerability tester looks for known vulnerabilities in an AUT 124 and reports potential exposures. In another example, a penetration tester or scanner is a test that looks for ways to exploit a normal course of business associated with the AUT 122

The scanning module 112 may send HTTP requests to the AUT 122 through the network via the request module 114, wherein the HTTP request is configured to attempt to expose a vulnerability of the AUT 122 or an attack surface of the AUT 122. The HTTP requests may include HTTPS requests, which combine the Hypertext Transfer Protocol with the SSL (Secure Sockets Layer) and TLS (Transport Layer Security) protocols to provide encrypted communication and secure identification of a network Web server.

During the processing of the HTTP request by the AUT 122, the real-time agent 126 can act as an observer that can monitor the internal processes performed by the AUT 122. For example, the real-time agent 126 can identify lines of code that are executed by the AUT 122, files that are accessed, database queries that are performed, and the like. Both the real-time agent 126 and the AUT 122 may be configured to communicate with the scanning module 112 over a same HTTP channel.

Figure 2:
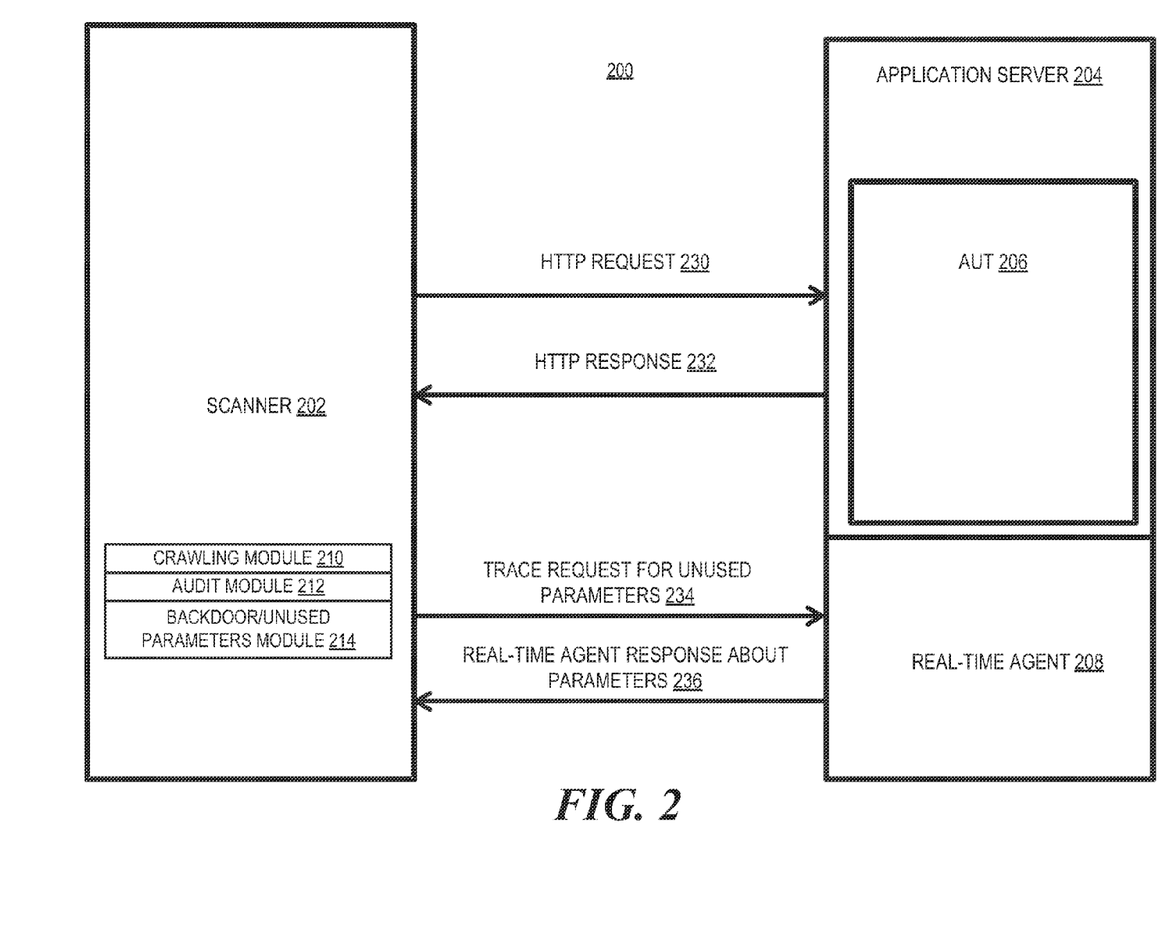
FIG. 2 is a block diagram of a computing system capable of determining unused parameters, according to one example.

As described further in reference to FIG. 2, some requests sent from the scanning module 112 to the server 120 may target the AUT 122 to elicit a response from the AUT 122 in accordance with its programming. Other requests sent from the scanning module 112 to the server 120 may target the real-time agent 126 to obtain additional information regarding the effect that a particular request had on the operations performed by the AUT 122 or other information related to the AUT 122, the real-time agent 126, or the server 120 hosting the AUT 122. Data received by the scanning module 112 in responses to application requests and service requests may be used by the scanning module 112 to generate vulnerability reports. Vulnerability reports may be displayed to the user though a user interface provided by the scanning module 112.

In one example, the system 100 can be used to determine whether an unused parameter is present in an associated request made by the scanning module 112 via the request module 114. In certain examples, the request module 114 can be used to generate and/or form requests that can be used in either crawling or auditing the AUT 122.

In this example, during a crawling phase, the request module 114 requests a web page of the AUT 122. The request may include zero, one, or more parameters. The AUT 122 can respond by executing its code in response to the request. Further, the real-time agent 126 can determine one or more parameter fields expected by the web page that were associated with the request. As noted, this can be done by monitoring what the AUT 122 expected or attempted to process. This could include one or more additional fields than the zero or more parameters used. Moreover, the real-time agent 126 can determine what parameter fields were unused by the request. This can be implemented by comparing the fields that may be processed by the web page code with the parameters used in the request. In certain examples, these unused fields can represent parameters that are referenced by name and are not present in the request.

In some examples, the scanning module 112 can request information about any unused parameters from the real-time agent 126. The server 120 can send a message to the computing device 110 identifying the one or more parameter fields that were unused by the request if there are unused parameter fields. Based on the information, one or more new requests can be generated and sent to cover the parameter fields. In one example, if there are no unused parameter fields, the crawling of the AUT can continue to a new crawling session. In another example, if there is/are unused parameter field(s), the requests can be generated during an audit phase. In some examples, auditing can occur while other crawling sessions are taking place.

In one example, each request can cover one of the parameter fields. In another example, each request can cover more than one of the parameter fields available. In yet another example, requests can be generated and sent for each of the combinations of each of the possible parameters that can be used (e.g., one, any two, all, etc. depending on the amount of parameter fields and/or unused parameters fields). Each of the unused parameter fields can be marked as parameters that are unused during a request.

The request module 114 can send the new request(s) including the one or more parameters in the one or more parameter fields that were unused. In some examples, the parameter fields can be populated with an arbitrary value. In other examples, the parameter fields are populated by one of a set of values (e.g., a Boolean true and a Boolean false). In yet other examples, the set of values may be set based on an analysis of the name of the parameter field.

The scanning module 112 can communicate with the AUT 122 to analyze what happens with the respective new request. The scanning module 112 can determine whether the new request results in an error. In one example, if the new request results in an error (e.g., an HTTP error code), further processing to determine whether the parameter can be used as a backdoor need not occur. If the new request does not result in an error, the scanning module 112 can flag the one or more parameter fields used in the corresponding request for further processing. In certain examples, during an audit phase, an audit session need not have access to information about other crawls other than the original request leading to the discovery of the unused parameter field(s) and the information gathered about that request.

The scanning module 112 can further determine whether the identified one or more parameter fields is used in another crawl session. For example, scanning module 112 may come across a link with a set of parameters for a web page in one scenario that has unused parameters, but also come across another link to the same web page with the unused parameters used. As such, if the unused parameters from one request were used in another request, the unused parameters would not be considered a backdoor vulnerability because it could be gotten to by clicking on available links.

The scanning module 112 can further determine whether the new request leads to an unexplored path of the AUT 122. This can be determined by comparing links/paths found from other crawl sessions with the links/paths found during the new request. In one example, the one or more unused parameter fields that are associated with the request can be marked as a backdoor if the new request leads to a previously non-accessible resource of the application under test 122. In some examples, a previously non-accessible resource (e.g., information, a database, a picture, an object, a digital tool, etc) can be a link to another area that is not accessible by the crawl without populating at least one unused parameter. In other examples, a previously non-accessible resource can be an object available because of the use of the parameter field that was previously unused.

The analysis to determine whether an unused parameter field is a backdoor can be done on each new request, for example, during a verification phase. As such, one set of unused parameter fields can generate an analysis on multiple requests. Further, resources can be preserved by not performing the analysis on all of the requests (e.g., ones that return errors or ones that do not lead to additional paths or resources), but by flagging them for further analysis if they meet certain criteria. For example, a request populating an unused parameter that does not return an error, but also does not return additional information or paths from the original request need not be checked against all of the links/resources from each of the crawl sessions. During the verification phase, the crawls and audits can be completed and the scanning module 112 can have a view of the entire AUT to determine if a backdoor exists. In some examples the verification phase occurs after the crawling and/car auditing phases. In other examples, phases can occur in parallel or after certain qualifications are met (e.g., when a crawl of a particular area of the AUT is completed).

A processor, such as a central processing unit (CPU) or a microprocessor suitable for retrieval and execution of instructions and/or electronic circuits can be configured to perform the functionality of any of the modules 112, 114, 122, 124, 126 described herein with regards to the computing device 110 and/or the server 120. In certain scenarios, instructions and/or other information can be included in memory.

Each of the modules 112, 114, 122, 124, 126 may include, for example, hardware devices including electronic circuitry for implementing the functionality described herein. In addition or as an alternative, each module 112, 114, 122, 124, 126 may be implemented as a series of instructions encoded on a machine-readable storage medium of computing device and executable by at least one processor. It should be noted that, in some embodiments, some modules are implemented as hardware devices, while other modules are implemented as executable instructions.

FIG. 2 is a block diagram of a computing system capable of determining unused parameters, according to one example. The system 200 may include a scanner 202, an application server 204, AUT 206, and a real-time agent 208. A crawling module 210 of the scanner 202 can be used to crawl the surface of the AUT 206 while an audit module 212 can be used to audit the surface to determine vulnerabilities. A backdoor/unused parameters module 214 can be used to determine whether an unused parameter or unused parameter field can be considered a backdoor.

The AUT 206 may be encoded in any suitable Web-based computer language, such as JAVA, or .NET, among others. The AUT 206 may operate within any suitable software framework, such as Struts, Struts 2, ASP.NET MVC, Oracle WebLogic, and Spring MVC, among others. The software framework includes a set of common code modules that provide generic functionality, which can be selectively overridden or specialized by user code to providing specific functionality. The AUT 206 may be configured to execute one or more instances of a Java Virtual Machine (JVM), Common Language Runtime (CLR), and/or other runtime environment for processing requests from the scanner 202. The programming instructions provided by the common code modules of the software framework or runtime environment may be referred to as container code. The custom programming instructions specific to the AUT 206 may be referred to as user code. During testing, a scanner 202 can explore the AUT 206 by making HTTP requests 230 and evaluating the HTTP responses or the lack thereof in order to find all of the URLs where the AUT 206 accepts input. Even though examples discussed herein are directed to a scanner 202, it is contemplated other security testing engines, modules, and/or techniques can be used. As shown in system 200, HTTP requests 230 can be used to crawl one or more web pages of the AUT 206 as a user and receive responses.

The AUT 206 includes a network interface (not shown) for enabling communications between the scanner 202 and the AUT 206 through the network. The network interface exposes the attack surface of the AUT 206 and is the same interface that would eventually be used to provide access to the AUT 206 when the AUT 206 is made available for general use.

Communication between the scanner 202 and the AUT 206 over the network interface may be conducted through application (e.g., via HTTP, web, etc.) requests issued from the scanner 202 to the AUT 206 and HTTP responses 232 issued from the AUT 206 to the scanner 202. Requests 230 targeting the AUT 206 may be referred to as application requests, and responses received from the AUT 206 may be referred to as application responses. The application requests 230 generated by the scanner 202 may be configured to expose potential vulnerabilities of the AUT 206, to respond to tests posed by the AUT 206, or the like. In some examples, the crawling module 210 first crawls the AUT 206 to determine an attack surface (and possibly vulnerabilities based on the surface being exposed) and then the scanner attacks the AUT 206 to determine vulnerabilities. In certain examples, the attack can occur after the crawling phase. In other examples, the attack can occur after a verification phase. In some examples, backdoors can be considered vulnerabilities separately of the attack. In other examples, the backdoors can lead to more severe attacks.

The real-time agent 208 can operate within the execution environment of the AUT 206 and has access to the internal operations performed by the AUT 206. Communications between the scanner 202 and the real-time agent 208 may be implemented through the use of custom request and response headers. Custom headers may be added to the application requests by the scanner 202, and custom headers may be added to the application responses by the real-time agent 208. In this way, at least some of the communications between the scanner 202 and the real-time agent 208 may be piggy-backed on normal communications with the AUT 206. Using a single channel of communication eliminates any problems with opening a dedicated, secondary channel, and adding HTTP headers typically does not interfere with the normal operation of the AUT 206.

In this scenario, a trace request for unused parameters 234 can be sent by the scanner 202 to the real-time agent 208. Further, the real-time agent 208 can send a response about the parameters 236.

In one example, during a crawling phase, the crawling module 210 can make HTTP requests 230 to the AUT 206 and receive HTTP responses 232. These requests and responses may be directed towards a web page of the AUT 206. A trace request for unused parameters 234 can then be sent to the real-time agent 208. The real-time agent 208 can determine whether there were any unused parameter fields associated with the respective HTTP requests 230 as further described herein. Then, the real-time agent 208 can send the response about the parameters 236 to the scanner 202.

In some examples, during the crawling phase, the information about the unused parameters can be used to generate a new or additional HTTP request(s) including any unused parameter fields. In some examples, the respective HTTP requests can include one of the unused parameters filled. In other examples, the HTTP requests can include more than one of the unused parameters filled, or a combination thereof. Analysis can be done on the requests to determine whether the requests lead to valid responses (e.g., no application error). Further, analysis can be done on the response to determine whether the respective new request is associated with more paths or resources than the original request. Moreover, the backdoor/unused parameter module 214 can determine whether the paths and/or resources that were found as extra as compared to the original request are new compared to links/paths/resources compared to other crawling sessions.

Figure 3:
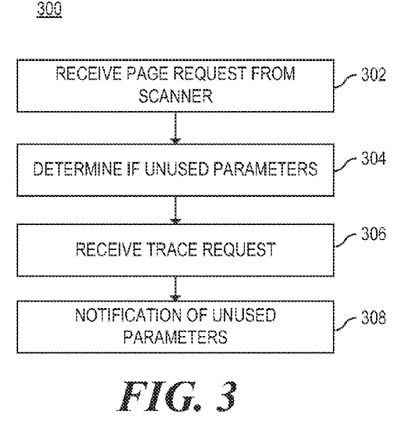
FIG. 3 is a flowchart of a method for determining unused parameters of an application under test hosted in association with a real-time agent, according to one example.

FIG. 3 is a flowchart of a method for determining unused parameters of an application under test hosted in association with a real-time agent, according to one example. Although execution of method 300 is described below with reference to server 120, other suitable components for execution of method 300 can be utilized. Additionally, the components for executing the method 300 may be spread among multiple devices, Method 300 may be implemented in the form of executable instructions stored on a non-transitory machine-readable storage medium, and/or in the form of electronic circuitry.

Method 300 can be used to determine unused parameter fields of a request. The server 120 can host an AUT 122. Further, the AUT 122 can be associated with a real-time agent 126 present on the server 120. A scanner can send a request for a web page or other resource of an AUT 122 (e.g., while performing a security crawl). The server 120 can receive the request for a web page of the AUT 122 from the scanner (302). The request can include zero or more parameters.

The real-time agent 126 can monitor execution of the page to determine one or more parameter fields expected by the page from the request (304). The parameter field(s) can be determined by comparing the zero or more parameters in the request with parameter fields that the AUT 122 looks for when processing the request. As such, the real-time agent 126 can determine whether at least one of the parameters is unused. Also, as noted above, the parameter field(s) can be used to make a decision during execution of a web page.

In some scenarios, the scanner can request a trace of unused parameters in the request. As such, the server 120 can receive the request (306) and can generate a message with a list of the unused parameters or unused parameter fields. Then, at 308, the server 120 can send the message to the scanner identifying the unused parameter fields or unused parameters. In one example, zero unused parameter fields are found, in another example, one unused parameter field can be found, and in yet another example, multiple unused parameter fields can be found. This information can be conveyed from the real-time agent 126 to the scanner.

Figure 4:
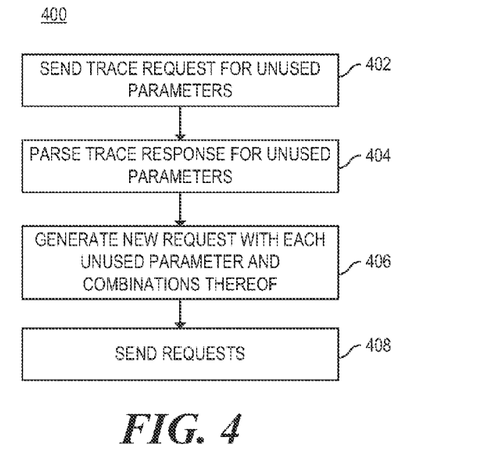
FIG. 4 is a flowchart of a method for using unused parameters of a webpage of an application under test by a scanner, according to one example.

In response the scanner can generate one or more new requests using one or more of the unused parameter fields as further described in relation to FIG. 4. The server 120 can then receive the other request for the web page from the scanner including one or more parameters associated with the parameter field(s) that was unused by the original request. The request for traces can occur after one or more requests for web pages (e.g., after each request). Further, the new request(s) can be processed to determine if the web page code being processed sees additional unused parameters. As such, execution of the web page and further web pages can be monitored to determine one or more other unused parameter fields.

FIG. 4 is a flowchart of a method for using unused parameters of a webpage of an application under test by a scanner, according to one example. Although execution of method 400 is described below with reference to computing device 110, other suitable components for execution of method 400 can be utilized. Additionally, the components for executing the method 400 may be spread among multiple devices. Method 400 may be implemented in the form of executable instructions stored on a non-transitory machine-readable storage medium, and/or in the form of electronic circuitry.

A scanning module 112 of the computing device 110 can be used to crawl an AUT. The computing device 110 can generate and send a request for a web page of the AUT. A server hosting the AUT can be associated with a real-time agent that can be used to monitor activities of the AUT. In some examples, the request for a web page can be accompanied by a trace request for unused parameters (402). In other examples, the real-time agent may automatically respond with any unused parameter fields without a request for a trace. The trace request may be a separate communication or be embedded within the request to the AUT. The real-time agent can process the request and send a response to the request. The scanning module 112 can receive the response from the real-time agent in the form of a message. In certain examples, the message may indicate no unused parameters. In other examples, the message can indicate that the web page includes one or more unused parameter fields as compared to the request.

At 404, the response to the trace is parsed for unused parameters. As such, the scanning module 112 can determine which unused parameter fields may have checked for by the code analyzing the request.

Then, at 406, another request for the web page can be generated if there are unused parameter fields. The other request can be a new request that includes one or more parameters that correspond to the unused parameter fields. Multiple requests can be made for a single parsed trace. In one example, there is one unused parameter field. A single request using an arbitrary value can be used in the request. Additionally or alternatively, a single request with a predetermined value (e.g., true, false, etc.) can be used. Further, multiple requests may be sent with predetermined values or arbitrary values.

In another example, more than one unused parameter field may be present. In this example, multiple requests can be made to populate the unused parameter fields, either individually, or in combinations (e.g., all parameter fields filled). One or more of the combinations may include particular values for certain parameter fields. Then, at 408, the scanning module 112 can cause sending of the request(s) to the server. The request(s) can include a request for traces for unused parameters as well. These traces can also be processed via method 400.

Figure 5:
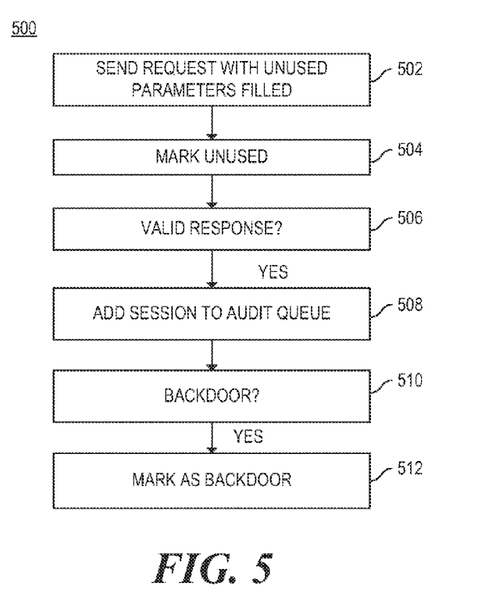
FIG. 5 is a flowchart of a method for determining if an unused parameter is a backdoor to an application under test, according to one example.

FIG. 5 is a flowchart of a method for determining if an unused parameter is a backdoor to an application under test, according to one example. Although execution of method 500 is described below with reference to computing device 110, other suitable components for execution of method 500 can be utilized (e.g., scanner 600). Additionally, the components for executing the method 500 may be spread among multiple devices. Method 500 may be implemented in the form of executable instructions stored on a non-transitory machine-readable storage medium, and/or in the form of electronic circuitry.

Method 500 can begin at 502 where a scanning module 112 causes the computing device 110 to send a request with one or more unused parameters populated to an AUT. Information about the unused parameter and/or its associated request can be marked as having an unused parameter field (504). This information can be stored for further processing.

The scanning module 112 can also determine if the request has a valid response (506). In one example, a valid response is a response that does not include an application error. For example, an invalid response may include an HTTP error code. In other examples, a valid response may be a response with a 2xx-series HTTP status code. This can indicate that the request is invalid and thus, further analysis on the subject need not be done. The scanning module 112 can determine whether the response is valid based on an analysis of the response provided by the AUT. If the response is valid, further analysis can be done.

At 508, the session information about the request with the unused parameter(s) can be added to an audit queue for further backdoor identification at 510. In another example, the scanning module 112 determines whether the request leads to a previously non-accessible resource of the AUT than an original request without the unused parameters. The unused parameter fields can be marked for further follow up if the request leads to a previously non-accessible resource.

During the determination of whether the unused parameters can be a backdoor, the scanning module 112 can determine whether use of the one or more parameters leads to an undiscovered area of the AUT based on an analysis of links discovered during a security crawl. This can be done after the security crawl is completed for the AUT and can include information about other web pages than the web page associated with the original request and unused parameter request(s). At 512, one or more parameters or parameter fields are marked as a backdoor if the one or more parameters do not appear as a regular parameter in any crawl session during the analysis of the links. The information about the unused parameter(s)/unused parameter field(s) can be stored based on one or more approaches. For example, information can be indexed based on the web page associated with the request, the particular parameter(s), the particular parameter fields, the particular crawl session that found the unused parameter(s), or the like.

Figure 6:
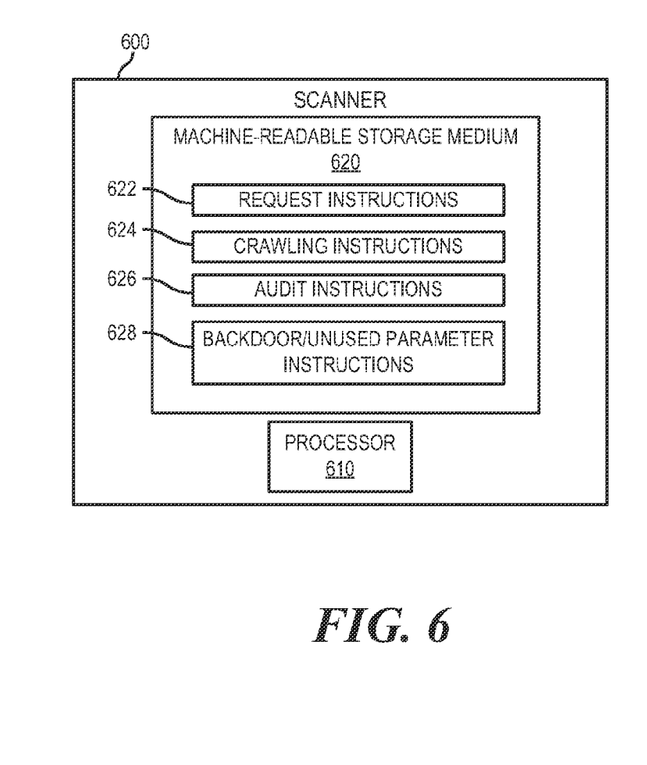
FIG. 6 is a block diagram of a scanner to determine whether an unused parameter is a backdoor, according to one example.

FIG. 6 is a block diagram of a scanner to determine whether an unused parameter is a backdoor, according to one example. The scanner 600 includes, for example, a processor 610, and a machine-readable storage medium 620 including instructions 622, 624, 626, 628 for determining whether an unused parameter is a backdoor. Scanner 600 may be, for example, a notebook computer, a slate computing device, a wireless email device, a workstation, a desktop computer, or any other computing device.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624, 626, 628 to implement methods 400 and/or 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626, 628.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for requesting 622 a response from a server, crawling an application under test 624, auditing a web application 626, and determining unused parameters and/or backdoor based on unused parameters 628.

The request instructions 622 can be used to generate one or more requests for information from an AUT or a real-time agent. Further, the crawling instructions 624 can be used to crawl the AUT during a security scan and collect information about an attack surface of the AUT. Moreover, in certain scenarios, the crawling instructions 624 can be used to control one or more requests. Audit instructions 626 can be executed by the processor 610 to attack the surface of the AUT. Further, backdoor/unused parameter instructions 628 can be used to determine unused parameters of one or more surfaces (e.g., web pages) of an AUT and/or determine whether the unused parameters/unused parameter fields are backdoors as described herein.

In some examples, the scanner 600 can implement the determination of unused parameters and/or backdoors in stages. In other examples, the stages can be intermingled. In a first stage, the crawling instructions 624 can be used to crawl an AUT in crawling sessions. The crawling sessions can request whether unused parameters were found by a real-time agent during the crawl session. If no unused parameters/parameter fields are found, the security crawl can continue. If unused parameters are found, then, the parameters and other session information of the security crawl session (e.g., the request, the parameters used in the request, the unused parameter fields, a combination thereof, etc.) can be saved and marked for audit.

Audit sessions can occur during the crawl sessions or after the crawl sessions. The audit sessions can include generating new requests to crawl based on the unused parameter information. Information from this phase can also be stored (e.g., a determination of whether the new requests have a valid response and/or are different from the previous request). If the scanner 600 determines that the response is valid and different (e.g., additional paths are found), the information can be used in a verification phase.

The verification phase can occur after crawling of the AUT is completed. As such, the backdoor/unused parameter instructions 628, when executed, can have a holistic view of the entire AUT instead of the narrow view of a request. At this stage, the respective unused parameters/unused parameter fields can be compared to the whole view of the AUT to determine whether the unused parameters were used in a different crawl. As such, the verification process can determine whether the new request using an unused parameter leads to a backdoor (e.g., if the request leads to a resource that is not found in another location of the AUT without populating one or more unused parameter).

Figure 7:
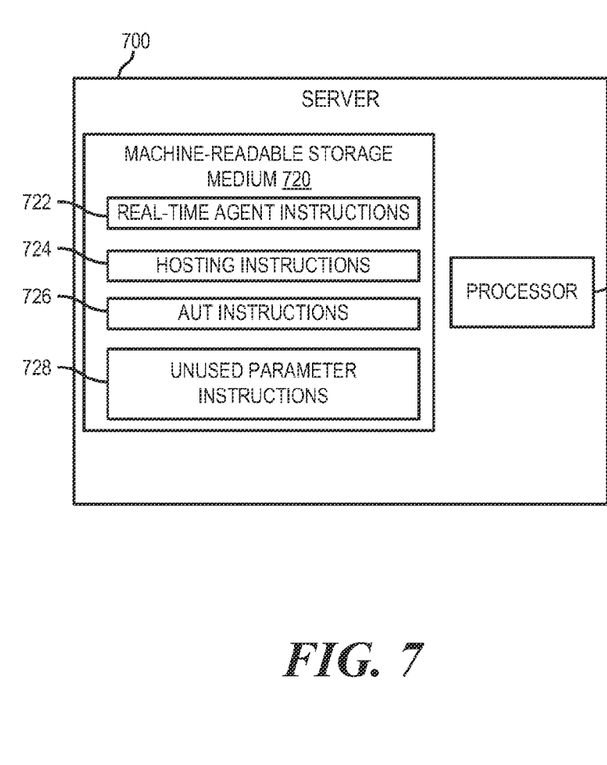
FIG. 7 is a block diagram of a server hosting an application under test, according to one example.

FIG. 7 is a block diagram of a server hosting an application under test, according to one example. The server 700 includes, for example, a processor 710, and a machine-readable storage medium 720 including instructions 722, 724, 726, 728 for hosting an AUT and discovering unused parameters for a scanner. Server 700 may be, for example, a workstation, a desktop computer, a laptop computer, a server, or any other computing device.

Processor 710 may be, at least one central processing unit (CPU), at least one semiconductor-based microprocessor, at least one graphics processing unit (GPU), other hardware devices suitable for retrieval and execution of instructions stored in machine-readable storage medium 720, or combinations thereof. For example, the processor 710 may include multiple cores on a chip, include multiple cores across multiple chips, multiple cores across multiple devices (e.g., if the computing device 700 includes multiple node devices), or combinations thereof. Processor 710 may fetch, decode, and execute instructions 722, 724, 726, 728 to implement method 300 or otherwise facilitate scanning of an AUT. As an alternative or in addition to retrieving and executing instructions, processor 710 may include at least one integrated circuit (IC), other control logic, other electronic circuits, or combinations thereof that include a number of electronic components for performing the functionality of instructions 722, 724, 726, 728.

Machine-readable storage medium 720 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 720 may be encoded with a series of executable instructions for hosting an application under test 724, real-time agent instructions 722 to provide insight into actions of an application under test, AUT instructions 726, and unused parameter instructions 728 that, when executed, can be used to determine whether unused parameters exist in the execution of the AUT compared to a request received from a scanner.

The AUT instructions 726 can be associated with one or more applications undergoing testing. The hosting instructions 724, when executed, can provide an environment to execute the AUT. Moreover, real-time agent instructions 722 can be used to observe and report information about the execution of the AUT to a scanner or other security test. The unused parameter instructions 728 can be a part of the real-time agent instructions 722. As such, when executed, the unused parameter instructions 728 can be used to determine whether unused parameters were looked for by a web page of the AUT that was requested by a scanner.

What is claimed is:

1. A computing system comprising:
   a server to host an application under test, wherein the server includes a real-time agent; and
   a computing device communicatively coupled to the application under test to in a current crawl session request a web page of the application under test;
   wherein the real-time agent determines one or more parameter fields expected by the web page associated with the request that were unused by the request in the current crawl session,
   wherein the server sends a message to the computing device identifying the one or more parameter fields as unused;
   wherein the computing device generates a new request including one or more parameters in the one or more parameter fields;
   and
   wherein the computing device is to identify the one or more parameter fields as not a backdoor vulnerability responsive to determining that the one or more parameter fields were used by a prior request in a prior crawl session.

2. The computing system of claim 1, wherein the computing device further is to:
   further determine whether the new request does not result in an error;
   identify the one or more parameter fields as unused; and
   flag the one or more parameter fields for further processing.

3. The computing system of claim 1, wherein the computing device is further to determine whether the new request leads to an unexplored path of the application under test.

4. The computing system of claim 3, wherein the one or more unused parameter fields are marked as a backdoor if the new request leads to a previously non-accessible resource of the application under test.

5. The computing system of claim 1, wherein the computing device in the current crawl session encounters a link to the web page in which the one or more parameter fields are unused,
and wherein, the computing device identifies the one or more parameter fields as not the backdoor vulnerability when the computing device, in the prior crawl session, encounters a different link to the web page in which the one or more parameter fields were used.

6. A method comprising:
hosting an application under test associated with a real-time agent;
receiving a request for a web page of the application under test from a scanner performing a security crawl on the application under test, wherein the request includes zero or more parameters;
monitoring execution of the page to determine one or more parameter fields expected by the page from the request;
comparing the zero or more parameters to the one or more parameter fields to determine whether at least one of the one or more parameter fields is unused;
sending a message to the scanner identifying that the at least one parameter field was unused;
receiving another request for the web page from the scanner including one or more other parameters associated with the at least one parameter field that was unused; and
identifying the at least one parameter field that was unused as not a backdoor vulnerability responsive to determining that the at least one parameter field that was unused was used by a prior request in a prior security crawl.

7. The method of claim 6, further comprising:
determining whether the other request for the web page has a valid response at the scanner.

8. The method of claim 7, wherein the valid response does not include an application error.

9. The method of claim 7, further comprising:
monitoring execution of the web page and further web pages based on the other request to determine one or more other unused parameter fields.

10. The method of claim 6, wherein the at least one parameter field that was unused is used to make a decision during execution of the web page.

11. A non-transitory machine-readable storage medium storing instructions that, if executed by at least one processor of a device, cause the device to:
send a request for a web page of an application under test associated with a real-time agent during a security crawl;
receive a message from the real-time agent indicating that the web page includes one or more unused parameter fields;
generate another request for the web page including one or more parameters corresponding to the one or more unused parameter fields;
send the other request to the application under test; and
identify the one or more unused parameter fields as not a backdoor vulnerability responsive to determining that the one or more unused parameter fields were used by a prior request during a prior security crawl.

12. The non-transitory machine-readable storage medium of claim 11, further comprising instructions that, if executed by the at least one processor, cause the device to:
determine whether the other request leads to a previously non-accessible resource of the application under test than the request; and
mark the one or more unused parameter fields for follow up if the other request leads to the previously non-accessible resource.

13. The non-transitory machine-readable storage medium of claim 12, further comprising instructions that, if executed by the at least one processor, cause the device to:
determine, during the follow up, whether use of the one or more parameters leads to an undiscovered area of the application under test based on an analysis of links discovered during the security crawl.

14. The non-transitory machine-readable storage medium of claim 11,
wherein the one or more unused parameter fields are used to make a decision during execution of the application under test.

* * * * *